(12) United States Patent
Jones et al.

(10) Patent No.: US 7,917,896 B2
(45) Date of Patent: *Mar. 29, 2011

(54) EXTENSIBLE EXECUTION LANGUAGE

(75) Inventors: Rodney Gene Jones, Hot Springs Village, AR (US); Linda Hayes Schoendienst, Plano, TX (US); Shawn Kersey, Dallas, TX (US)

(73) Assignee: Worksoft, Inc., Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/572,738

(22) Filed: Oct. 2, 2009

(65) Prior Publication Data

US 2010/0023929 A1    Jan. 28, 2010

Related U.S. Application Data

(63) Continuation of application No. 11/033,361, filed on Jan. 11, 2005, now Pat. No. 7,600,220.

(51) Int. Cl.
*G06F 9/44* (2006.01)

(52) U.S. Cl. ........................................................ 717/124

(58) Field of Classification Search .................. None
See application file for complete search history.

(56) References Cited

U.S. PATENT DOCUMENTS

| | | | |
|---|---|---|---|
| 6,662,312 B1 | 12/2003 | Keller et al. | |
| 7,155,639 B2 | 12/2006 | Gorshenev et al. | |
| 7,185,235 B2 | 2/2007 | Radestock | |
| 7,373,636 B2 | 5/2008 | Barry et al. | |
| 7,437,713 B2 | 10/2008 | Beardsley et al. | |
| 2003/0140138 A1 | 7/2003 | Dygon et al. | |
| 2004/0107415 A1 | 6/2004 | Melamed et al. | |
| 2004/0194063 A1 | 9/2004 | Pereira | |
| 2005/0172267 A1 | 8/2005 | Bergin | |
| 2006/0080638 A1 | 4/2006 | Fiore | |
| 2006/0156288 A1 | 7/2006 | Jones et al. | |

FOREIGN PATENT DOCUMENTS

| | | |
|---|---|---|
| WO | 2006-130684 A2 | 12/2006 |
| WO | 2007-070414 A2 | 6/2007 |

OTHER PUBLICATIONS

PCT: International Search Report and Written Opinion of the International Searching Authority of PCT/US08/70289; Jan. 28, 2009; 6 pgs.

*Primary Examiner* — Wei Y Zhen
*Assistant Examiner* — Junchun Wu
(74) *Attorney, Agent, or Firm* — Howison & Arnott, L.L.P.

(57) ABSTRACT

A system and method for automated software testing includes defining a data model of an automated software test for an application being tested and then identifying an address for a function library at a remote location for executing the data model of the automated software test based upon the platform of the application. This identified function library is accessed at the address at the remote location so that an execution of a function within the function library may be invoked to obtain results therefrom.

16 Claims, 4 Drawing Sheets

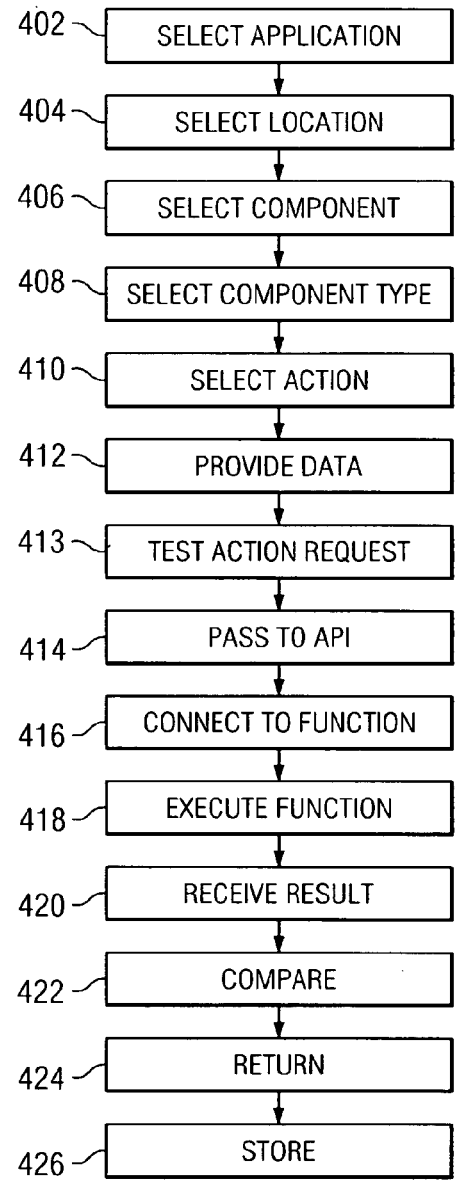
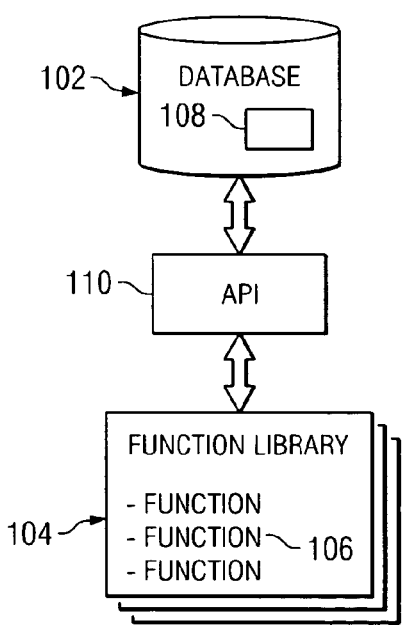
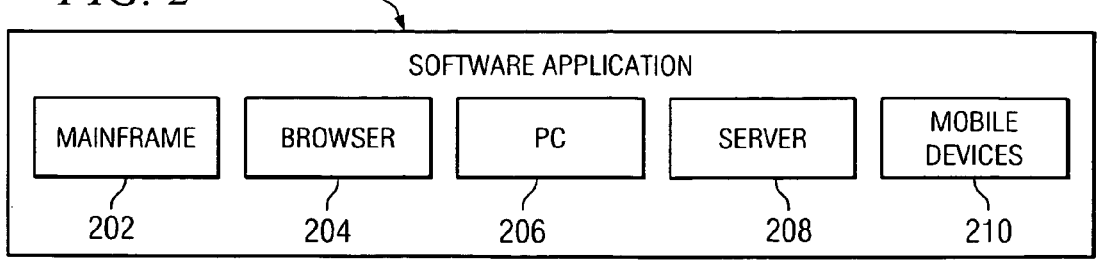

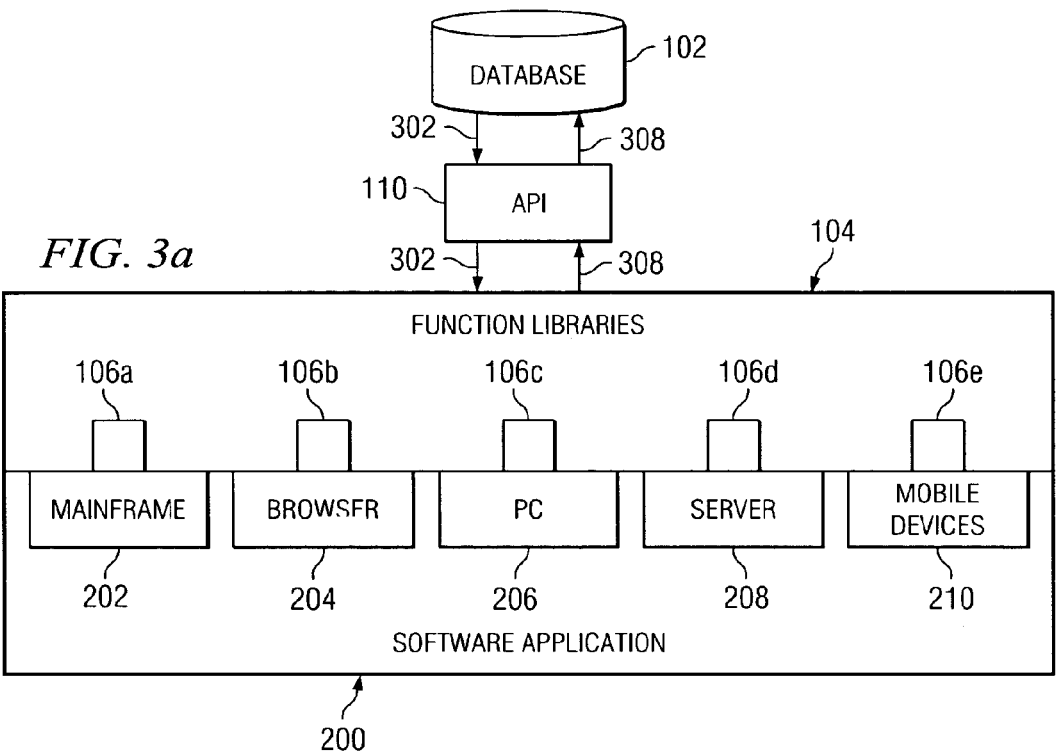
*FIG. 3a*
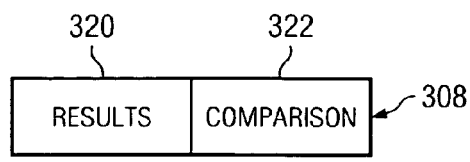
*FIG. 3b*
*FIG. 3c*

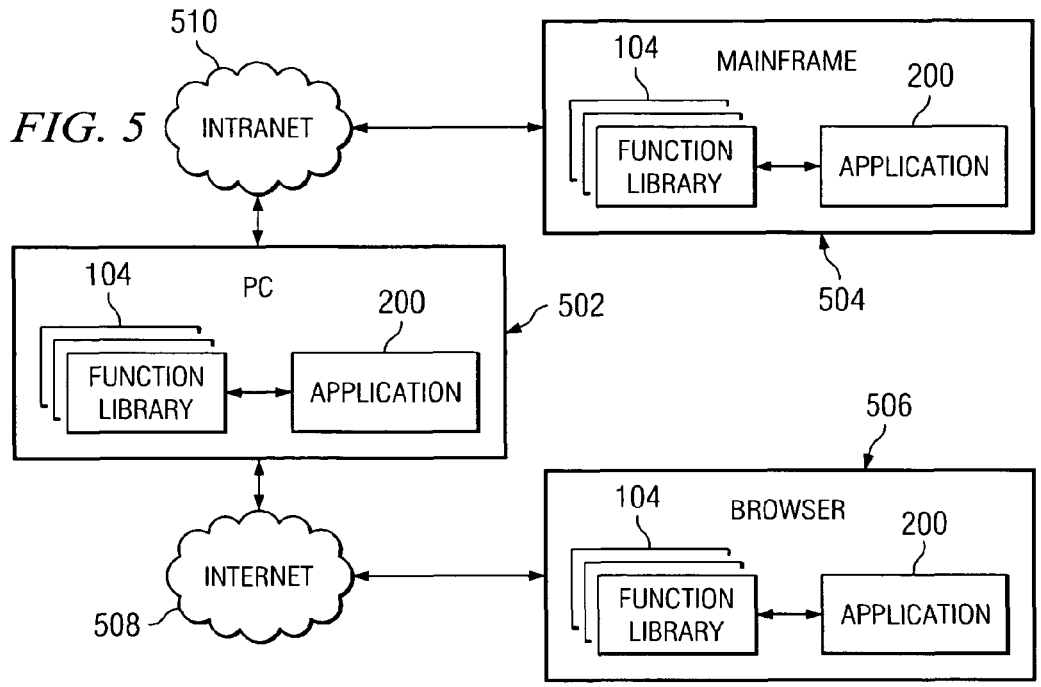
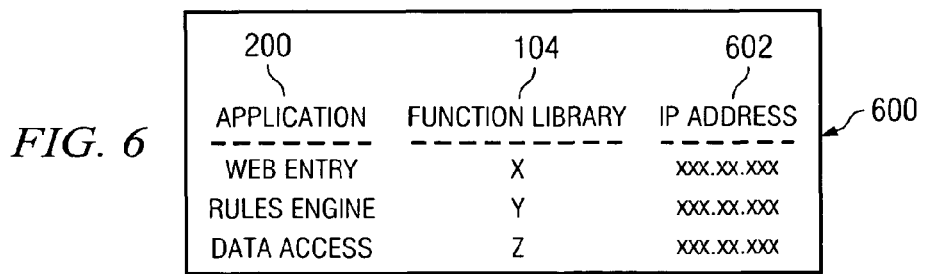
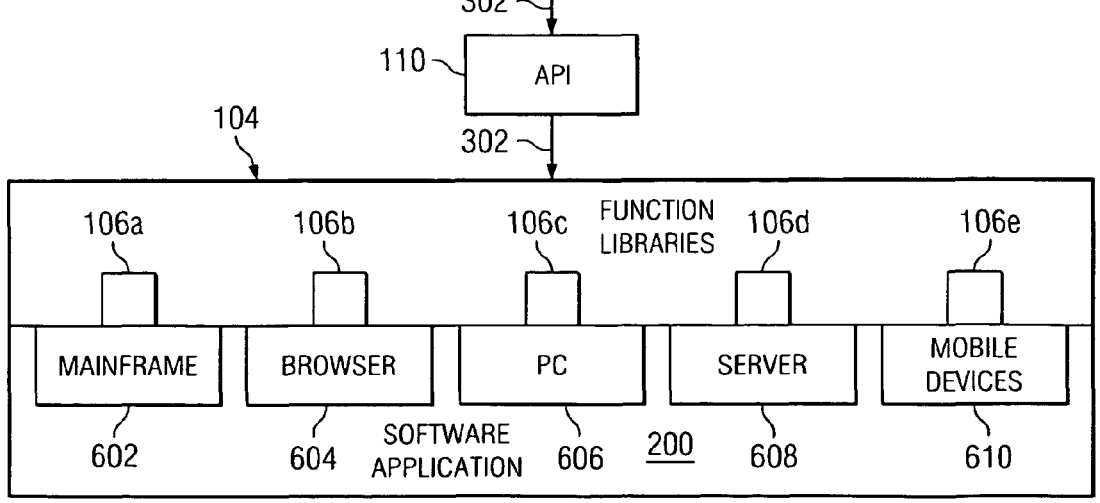

EXTENSIBLE EXECUTION LANGUAGE

CROSS-REFERENCE TO RELATED APPLICATIONS

This application is a Continuation of U.S. patent application Ser. No. 11/033,361, filed on Jan. 11, 2005 and entitled "EXTENSIBLE EXECUTION LANGUAGE," which will issue as U.S. Pat. No. 7,600,220 on Oct. 6, 2009.

TECHNICAL FIELD

The present invention relates to automated software testing across multiple software platforms, and more particularly, to a method for testing across multiple software platforms using a mix of languages.

BACKGROUND

The implementation of software on a computer system requires that the software be tested in order to confirm that is operating as expected. Historically, software functionality has been tested by creating a large combination of inputs to the software and verifying the outputs against the expected correct response.

To date, these inputs have been supplied and outputs verified either by manual or automated test execution. Manual execution is time and labor intensive, so automation is important to achieve economical test coverage. Scripting languages enable a programmer to automate test execution by simulating manual activity using code.

The problem with using scripting languages is that they are platform specific. Modern applications comprise components that are distributed over multiple platforms, and functionality may be ported from one platform to another. This requires a means of test automation that can execute across multiple platforms using the languages best suited to each platform, with flexibility to change to different languages should future needs arise.

SUMMARY

The present invention disclosed and described herein, in one aspect thereof, comprises a system and method for automated software testing. A data model is defined of an automated software test for an application being tested. An identification is made of at least one available address for a function library at a remote location for executing the automated software test based upon a platform of the application being tested. The identified function library is accessed at the remote location to invoke an execution of a function in the function library to obtain results from the execution of the function.

BRIEF DESCRIPTION OF THE DRAWINGS

For a more complete understanding, reference is now made to the following description taken in conjunction with the accompanying Drawings in which:

FIG. 1 is a general block diagram illustrating a system for automated application testing;

FIG. 2 is a block diagram illustrating a software application which may be executed over multiple platforms;

FIG. 3a is a block diagram illustrating the system enabling automated testing of software over multiple platforms;

FIG. 3b illustrates a test action request;

FIG. 3c illustrates results provided from a function library;

FIG. 4 illustrates the process for executing an automated test over multiple platforms;

FIG. 5 illustrates a further embodiment of the system of FIG. 2 wherein the system library function tools are distributed over multiple platforms locations;

FIG. 6 is a block diagram illustrating the system enabling automated testing of software, wherein the function libraries are located at a number of IP addresses;

DETAILED DESCRIPTION

Figure 7:
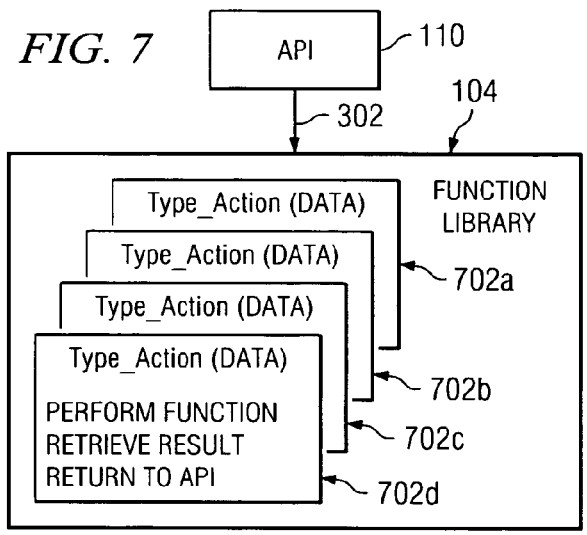
FIG. 7 illustrates a function library.

Referring now to the drawings, and more particularly, to FIG. 1, there is a system and method for automated software testing that enables the automation of test procedures whose definition is independent from a specific platform or scripting language. The system comprises a database 102 containing the test procedures that is logically connected during execution to one or more function libraries 104 containing a number of functions 106 that are specific to a particular language or platform. This database 102 describes the enterprise execution environment including all applications, application components, platforms and their location, and a table 108 that describes how each type of component is recognized and what actions can be performed against it.

The test procedures are constructed within the database 102 by selecting the application, the component within the application, the action to be performed against the component, and the relevant data value(s) to be either input to the software or verified against the output. This data is passed to an application program interface (API) 110 that makes a call to the function library 104 associated with the platform and invokes the function 106 needed to execute the specified action. The function 106 returns its results to the API 110, which in turn logs the results into the database 102 contained within the modeled test procedure. These functions 106 may be written in any language or protocol that is appropriate to the associated platform or software operating environment. Thus, a mix of these functions 106 on different platforms may be executed during a single test procedure, and functions 106 may be substituted if the same test procedure must be executed on another platform.

Platforms are identified by an interface mechanism. This interface mechanism may be operating system dependent or independent, or may be a capability of the development environment used to construct the application. For example, the Windows operating system provides an API for standard application components within its environment, while the Java runtime environment is operating system independent and supports accessibility through a standard class. Applications developed using either Java or NET provide reflection interfaces, and applications executing within a browser may be accessed through the document object model interface. This multiplicity of potential interfaces introduces complexity into the automated test process that this invention addresses.

Referring now to FIG. 2, there is illustrated a software application 200 that requires an automated software testing procedure. The software application 200 may include any type of code operable on any hardware platform or in any software environment. The software application 200 includes components that are distributed across a mainframe 202, a browser 204, a PC 206, a server 208 and mobile devices 210. The mobile devices 210 may include any number of devices including a mobile telephone personal data assistant, mobile e-mail device, etc. Thus, the execution of the software application required the execution of each of these components in different platforms and any testing procedure must demonstrate this behavior.

As can be seen, an automated test-procedure using a scripting language formatted only for the mainframe platform would be able to test the inputs and outputs of the mainframe component 202 of the software application 200 but cannot provide testing capabilities with respect to the remaining components. Likewise, scripting languages for mobile devices 210 may not be able to execute components against the mainframe 202, browser 204, PC or server 208. The limits of a particular scripting language to a specific component greatly limits the use of the scripted language. The manner of overcoming this problem is using multiple scripting languages, one for each separate component. However, composing a testing procedure for each component would require a great deal of programming time.

Referring now to FIG. 3a, there is illustrated a block diagram of the system enabling the automation of software testing across any platform using a mix of scripting languages. The database 102 contains data models of automated test procedures described by actions to be performed on the application and components associated with different platforms to execute tests over each of the components. The data model of the automated test procedure including the application, its location, component, the component type, action and data combined are forwarded from the database 102 to an API 110. The application, its location, the component, the component type, action and data comprises the test action request 302 illustrated in FIG. 3b.

The application 303 includes an indication of the software application which is being tested by the automated testing software. The location information 305 provides an indication of the location of the application being tested. The component information 307 includes an indication of the part of the software application that is to be tested. The component type 309 indicates what kind of component is to be tested. The action information 311 provides an indication of which particular function or activity is to be formed on the selected component type, and the data 313 includes any physical data necessary to carry out the requested action on the component. The test action request 302 enables the API 110 and function libraries 106 to perform any desired test execution.

Referring now back to FIG. 3a, the API 110 selects the particular function 106 from a function library 104 based on the platform necessary to perform the action forwarded from the database 102 in the test action request 302 and routes the test action request 302 to the proper function library 104 based on the location of the application. The selected function 106 performs the action included within the test action request 302 to generate a particular test result based upon the provided data. The function 106 receives back the actual results, which are compared to the expected results at the function 106. These results 308, including either or both of the actual results and the comparison results, are sent back to the database 200 through the API 110 and saved for logging purposes in the database 102.

The function library 104 comprises one or more functions 106 each associated with a particular component. Each of the functions 106 executes the test action request 302 and generates a result 308 of the action including any returned data values. The results 308 illustrated in FIG. 3c includes the results 320 provided by function library 104 and the results of the comparison 322 of the results 320 with an expected result. The expected result is provided to the function library 104 from the database 102 in the test action request 302. Using a combination of the functions 106, applications 200 may be tested over a number of platforms. Thus, for example, an application 200 that is executed on a browser 204, PC 206 and a mobile device 210 would provide a test action request that accessed function 206b, 206c and 206e to generate results 308 simulating execution of the application 200 across these components. Each of the functions 106 in the function libraries 104 enable particular actions to be executed on the platforms with which the function 106 is associated. Function 206a enables the execution of actions on a mainframe platform 102. Functions 206b execute actions against components on a browser platform 104. Functions 206c execute actions on a PC platform 106. Function library 206d executes actions on a server platform 108 and function 206e executes actions against components associated with mobile device platforms 110.

Referring now to FIG. 4, there is a flow diagram illustrating the process by which a particular test procedure may use the cross-platform automated software testing functionalities of the present invention. Initially, at step 402, an application to be tested is selected from the database 102. Next, the location of the application 200 is selected at step 404 from a list of the application platforms within the database 102; the location comprises an IP address of the related function library 104. Next, a component within the application 200 is selected at step 406. The component comprises some part of the application which is to be tested by the automated testing process. The database 102 performs at step 408 a lookup of the component type from the database 102. The type of the component describes its characteristics; for example, whether it is a text field, a push button, a menu or a list. Each component type has an associated list of actions that may be performed against the component; for example, input or verify the value in a text box. Next, an action that may be associated with the selected component type is selected at step 410, and all necessary data parameters for performing the selected action on the component are supplied at step 412. This collection of information is stored as a test action request 302 at step 413, and passed to the API 110 at step 414.

The API 110 uses the IP address of the function library 104 within the test action request 302 to connect at step 416 to the associated function 106 in the function library 104 necessary for carrying out the software test. The test action request 302 is used to invoke the function 106 to execute at step 418 the information contained in the test action request 302. This process involves performing the provided action on the provided component using any of the data provided in the test action request 302. A result is received from the execution of the function at step 420 and the result may be compared to an expected result at step 422. The results 408 are returned to the database 102 via the API 110 at step 424. The results 408 are stored at step 426 within the database 102.

In FIG. 5, there are illustrated function libraries 104 and an application 200 which resides upon multiple platforms at multiple locations. The function libraries, 104 are separated between a PC platform 502 in a first location, a mainframe platform 504 in a second location and a web browser platform 506 in a third location. Each of these platforms is able to communicate with each other via the Internet 508 or intranet 510. The application 200 is additionally implemented on each of the different platforms illustrated in FIG. 5. The fact that the application 200 may be executed on the PC platform 502, mainframe platform 504 and browser platform 506 require that locations of the function libraries 104 must be able to be determined such that the automated test execution may be run. The locations of the function libraries 104 are identified by an IP address.

The PC platform 502 includes application 200 and function libraries 104, that are associated with execution on the PC platform 502. The PC platform 502 is able to communicate with the mainframe platform 504 via an intranet 510. The intranet 510 may comprise any type of internal network that is implemented within a defined location or area such as a company intranet. The PC platform 502 communicates with the browser platform 506 over the Internet 508. The Internet 508 comprises a worldwide communications network enabling wide spread communication amongst connected entities.

The mainframe platform 504 also includes applications 200 and function libraries 104 that are executed within this operating environment. Likewise, the browser platform 506 includes applications 200 and function libraries 104 that are executable and operable within the browser environment. Since the function libraries 104 are located and associated with different platforms that are interconnected via an intranet 510 or internet 508, in order for an application program interface to access these function libraries 104 to perform automated testing procedures, there is the necessity of some manner for accessing these function libraries 104 in different locations.

In FIG. 6 there is illustrated the operation of the automated software testing system of the present invention having function libraries 104 located at a number of locations having separate IP addresses. Thus, the mainframe 602, browser 604, PC 606, server 608 and mobile devices 610, and the associated functions 106 of the function libraries 104 are at separate locations associated with separate IP addresses. In order to make it possible for the API 110 to locate a particular function 106 in a function library 104, each application 200 at a particular location 202-210 will have associated therewith an IP address. The function 106 at that location associated with the application is accessed via the Internet 508 or an intranet 510 using this IP address. In this manner, the API 110 may access functions 106 by routing test action requests 302 to and receiving results from the IP address which is associated with the application location 202-210 and function 106.

The table 600 containing the information including the application 200, function library 104 and IP address 602 is contained within the database 200 described with respect to FIG. 1. Thus, rather than the API 110 routing the test action request 302 to a particular location containing the function library 104, the API 110 routes the test action request 302 to the IP address containing the application 200 and function library 104 necessary to provide the application test execution. In this manner, a much greater variety of function libraries 104 may be accessed since a user is not limited to those function libraries contained within the processing entity with which the user is working but may access any platform containing function libraries 104 that are accessible via some type of intranet or Internet network.

Referring now to FIG. 7, there is illustrated a function library 104 which is comprised of a set of functions 702a-d that are each associated with a component type and the action to be performed against the component type and the process performed by the function library 104. The API 110 passes the test action request 302 that contains the component, component type, action and data to the function library 104, and the function library 104 selects the function 702 that is associated with the selected action and component type. This function 702 executes the action and retrieves the result, which is returned to the API 110. The particular function 702 within the function library 104 that is selected for generating the execution results is selected based upon the component selected, the type of action that is being performed and the data upon which the action is to be performed. The function library 104 is at a location having an associated IP address.

Figure 8:
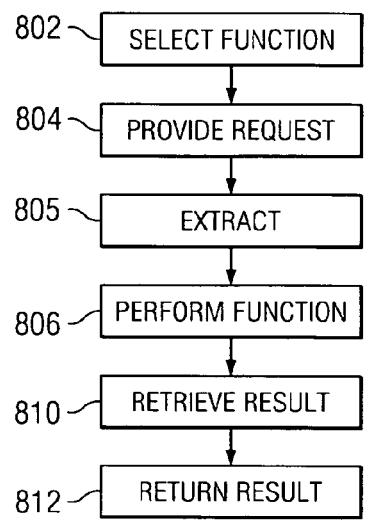
FIG. 8 illustrates the operation of a function library.

The operation of the function library 104 is more fully illustrated in FIG. 8, wherein, once the function is selected at step 802, the test action request 302 is provided to the selected function 106 at step 804. The function 106 extracts at step 805 the provided data from the test action request 302 and uses this data to perform the particular action associated with the selected function on a particular component at step 806. This operation provides a particular result and this result is retrieved at step 810 such that the results may be provided back to the application program interface at step 812. Alternatively, results from step 810 may be compared to an expected result and this result is additionally provided back to the API at step 812. In this manner, for the selected action and associated data, a simulation may be performed on any number of platforms or software operating environments.

Figure 9:
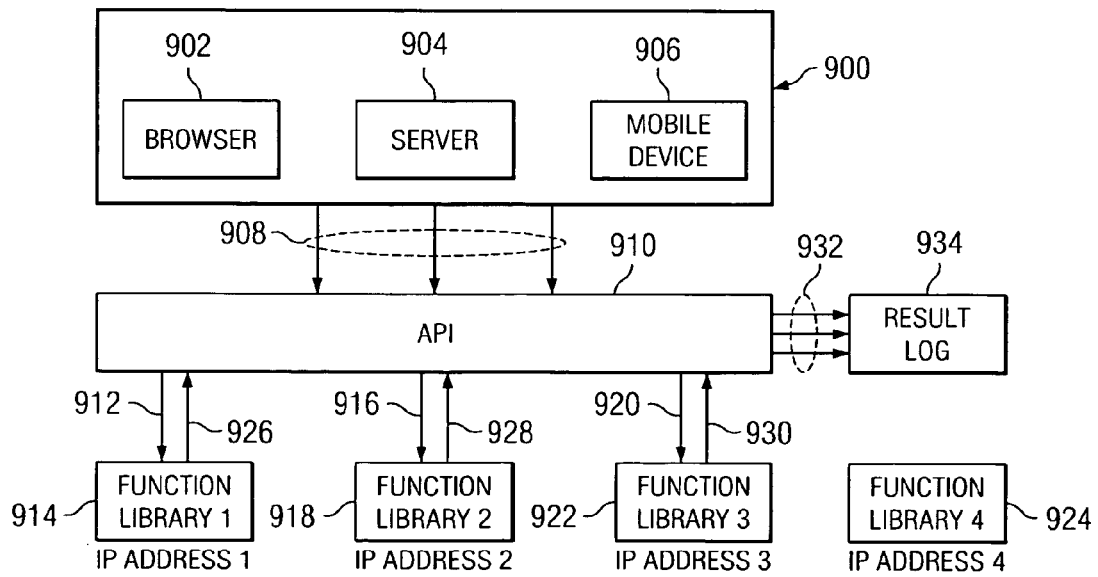
FIG. 9 illustrates an example of testing an application using the described system.

Referring now to FIG. 9, there is provided a particular example wherein the system of the present disclosure is used to execute tests for an application 900. The application 900 includes three components, a browser component 902 that is operable within a browser environment, a server component 904 that is operable within a server environment and a mobile device component 906 that is operable within a mobile device environment. A test action request 908 is created for each of these components. The makeup of the test action request 908 depends upon the particular action that is desired to be tested with respect to the application 900 for the associated component. While the disclosure with respect to FIG. 9 illustrates a test action request 908 being created for each of the browser component 902, server component 904 and mobile device component 906, a user might desire to test only a single one or pair of these components, in which case there would only be one or two test action requests 908 provided to the application program interface 910. Additionally, any component of the application 900 may be tested in addition to those discussed above.

The application program interface 910 utilizes the IP address information within each of the test action requests 908 to route the test action request to three different function libraries associated at three different locations having separate IP addresses. For the test action request 908 for the browser component 902, the API routes the test action request at 912 to function library one 914 at IP address one. For the server component 904, the test action request 908 is routed at 916 from the API to a function library two 918 at IP address two. Finally, the test action request 908 for the mobile device component 906 is routed to function library three 922 at 920 wherein the function library three 922 is located at IP address three. It is noted that no test action request 908 is transmitted to function library four 924 at IP address four since no component requiring the functions of function library four is included within the application 900 being tested.

Each of the function libraries 914, 918 and 922 generates a result in the manner described hereinabove responsive to each of the test action requests 908 received from the application program interface 910. The results may be compared with an expected result in the test action request 908 to see if they match. The function libraries 914, 918 and 922 transmit the results back to the API 910. Function library one 914 transmits the results of the test for the browser component to the API at 926. Function library two 918 transmits the results for the test of the server component 904 back to the API at 928. Function library three 922 transmits the results of the test for the mobile device component 906 back to the API at 930. Each of the results received at the API 910 is transmitted from the API 910 at 932 to a result log 934. There are three separate results transmitted from the API 910 to the result log 934 at 932 since there are three separate results coming from each of the function libraries 914, 918 and 922. Each of these results are associated with a separate test for each of the browser component 902, server component 904 and mobile device component 906, respectively. The result log 934 then has three separate results stored therein that may be accessed by the user to determine the results of a test for application 900.

Although the preferred embodiment has been described in detail, it should be understood that various changes, substitutions and alterations can be made therein without departing from the spirit and scope of the invention as defined by the appended claims.

What is claimed is:

1. An apparatus, comprising:
   a non-transitory computer-readable storage media containing a set of instructions for a general purpose computer;
   wherein execution of the set of instructions by the general purpose computer configures the general purpose computer to:
   define within a database a generic data model of a software test that is independent of a specific execution platform for testing a software application that operates across a plurality of execution platforms during execution, said generic data model including, a data component, an action to be performed on the data component and an expected result of the action on the data component that may be implemented on the plurality of execution platforms;
   identify at least one function for implementing the generic data model for testing on each of the plurality of execution platforms, the software application that is operating across the plurality of execution platforms; and
   execute the generic data model using the at least one function for each of the plurality of execution platforms and obtaining test results therefrom.

2. The apparatus of claim 1, wherein the execution of the set of instructions by the general purpose computer further enables the general purpose computer to:
   select a software application from the database;
   select a location of the software application subsystem;
   select the component from the software application;
   look up a component type in the database;
   select the action to be performed on the component based on its type;
   provide data parameters for the action.

3. The apparatus of claim 1, wherein the execution of the set of instructions by the general purpose computer further enables the general purpose computer to look up a location in the database of the function and retrieve the IP address associated with the function for the application platform.

4. The apparatus of claim 1 wherein the execution of the set of instructions by the general purpose computer further enables the general purpose computer to compare the test results of the execution of the function against the expected test results.

5. The apparatus of claim 4, wherein the execution of the set of instructions by the general purpose computer further enables the general purpose computer to return the test results of the execution and the comparison to the database.

6. The apparatus of claim 1 wherein the execution of the set of instructions by the general purpose computer further enables the general purpose computer to store the results in the database.

7. A system for providing automated software testing, comprising:
   a database implemented on a non-transitory machine readable media enabling a creation and storage of a generic data model of a software test that is independent of a specific execution platform for testing a software application that operates across a plurality of execution platforms during execution, the generic data model including a data component, an action to be performed on the data component and an expected result of the action on the data component that may be implemented on the plurality of execution platforms; and
   a plurality of functions implemented on a machine readable medium each function implementing specific actions necessary for executing the generic data model for a particular execution platform of the plurality of execution platforms; and
   wherein execution of the generic data model using an identified at least one function of the plurality of functions for each of the plurality of execution platforms provides test results therefrom, the identified at least one function implementing the generic data model to test on each of the plurality of execution platforms the software application that is operating across the plurality of platforms.

8. The system of claim 7, wherein the plurality of function libraries execute a selected action against a selected component.

9. The system of claim 7, wherein the database further comprises:
   data describing a plurality of software applications;
   data describing a plurality of platforms, a set of software application components, each representing a field or control for receiving or returning data or status in the software application;
   data describing a plurality of component types; and
   data describing a plurality of actions that may be associated with component types.

10. The system of claim 7, wherein the plurality of functions are written in a plurality of programming languages enabling execution across the plurality of execution platforms across which the software application may be executed.

11. The system of claim 7, wherein the plurality of functions provide data describing an actual test result for execution of a selected component and a selected action.

12. A method for automated software testing, comprising the steps of:
   defining within a database a generic data model of a software test that is independent of a specific execution platform for testing a software application that operates across a plurality of execution platforms during execution, said generic data model including a data component, an action to be performed on the data component and an expected result of the action on the data component that may be implemented on the plurality of execution platforms;
   identifying at least one function for implementing the generic data model of the software test based on each of the plurality of execution platforms for the software application;
   executing the generic data module using the at least one function for each of the plurality of execution platforms at the remote location and obtaining test results therefrom;

returning the test results of the executions to the database; and storing the test results in the database.

13. The method of claim 12, wherein the step of defining a generic data model of a software test further comprises the steps of:
  selecting the component from the software application;
  looking up a component type in the database;
  selecting the action to be performed on the data component based on its type;
  providing data parameters for the action to be performed.

14. The method of claim 12, wherein the step of identifying further comprises the steps of looking up a location in the database of the at least one function and retrieving the IP address associated with the function library for the application platform.

15. The method of claim 12 further including the step of comparing the test results of the execution of the function against the expected test results.

16. The method of claim 15, wherein the step of returning further includes the step of returning the test results of the execution and the comparison result to the database.

* * * * *